United States Patent
Chang

(10) Patent No.: US 8,364,097 B2
(45) Date of Patent: Jan. 29, 2013

(54) DEVICE AND METHOD FOR SELECTING TRANSMISSION PATH IN WIRELESS NETWORK

(75) Inventor: Chung-Yao Chang, HsinChu (TW)

(73) Assignee: Realtek Semiconductor Corp., Hsinchu (TW)

( * ) Notice: Subject to any disclaimer, the term of this patent is extended or adjusted under 35 U.S.C. 154(b) by 304 days.

(21) Appl. No.: 12/683,761

(22) Filed: Jan. 7, 2010

(65) Prior Publication Data

US 2010/0172426 A1    Jul. 8, 2010

(30) Foreign Application Priority Data

Jan. 7, 2009    (TW) .............................. 98100410 A

(51) Int. Cl.
*H04B 1/04* (2006.01)
(52) U.S. Cl. .................. 455/103; 455/188.1; 455/234.1; 455/73; 455/78; 455/84; 375/260
(58) Field of Classification Search .................. 455/103, 455/188.1, 234.1, 73, 78, 84; 375/260
See application file for complete search history.

(56) References Cited

U.S. PATENT DOCUMENTS

| | | | | |
|---|---|---|---|---|
| 5,371,734 A | * | 12/1994 | Fischer | 370/311 |
| 5,491,723 A | * | 2/1996 | Diepstraten | 375/267 |
| 6,281,840 B1 | * | 8/2001 | Miyoshi et al. | 342/374 |
| 7,634,241 B2 | * | 12/2009 | Bagchi | 455/188.1 |
| 2005/0113039 A1 | * | 5/2005 | Tsukamoto | 455/101 |
| 2007/0066244 A1 | | 3/2007 | Kao et al. | |
| 2008/0119141 A1 | | 5/2008 | Lin et al. | |
| 2009/0147878 A1 | * | 6/2009 | Nakao | 375/267 |
| 2011/0026418 A1 | * | 2/2011 | Bollea et al. | 370/252 |

* cited by examiner

*Primary Examiner* — Sanh Phu
(74) *Attorney, Agent, or Firm* — McClure, Qualey & Rodack, LLP

(57) ABSTRACT

A device for selecting a transmission path in a wireless network includes a radio frequency (RF) module, a base band (BB) module, and a control module. The RF module is coupled to a plurality of antennas, for processing a packet of a wireless signal respectively received by the antennas. The BB module generates signal strengths (SSs) corresponding respectively to the antennas according to the packet received by each antenna. The control module is coupled to the BB module, for receiving the SSs and respectively controlling the antennas so that they may be enabled or disabled according to a difference between the SSs.

18 Claims, 3 Drawing Sheets

DEVICE AND METHOD FOR SELECTING TRANSMISSION PATH IN WIRELESS NETWORK

CROSS-REFERENCES TO RELATED APPLICATIONS

This non-provisional application claims priority under 35 U.S.C. §119(a) on Patent Application No. 98100410 filed in Taiwan, R.O.C. on Jan. 7, 2009, the entire contents of which are hereby incorporated by reference.

BACKGROUND

1. Technical Field

The disclosure relates to a wireless network, and more particularly to a device and a method for selecting a transmission path in a wireless network.

2. Related Art

In a wireless network system, a plurality of transceiver antennas has many advantages, for example, enhancing the receiving stability and improving the data throughput (TP). Therefore, a multi-input multi-output (MIMO) technology formed by the plurality of antennas has been widely applied to the wireless network system.

In the MIMO mechanism, a difference of signal strengths (SSs) between the plurality of transceiver antennas may easily become too large. Examples are given as below.

In a first example, the signal transmission is easily affected by the wireless channel, for example, multipath, fading, and mobility, which could lead the varied SSs between the plurality of transceiver antennas.

In a second example, antenna modules have different conditions (such as different receiving paths corresponding to different antennas), and thus the gains of the antennas are different.

When the SSs of the antennas are different, the receiving capabilities of other antennas would be affected if the SS of a certain antenna is too low, thereby decreasing the overall data throughput. Transmission paths of the MIMO must therefore be appropriately controlled in order to enable the MIMO wireless network to achieve the advantages.

SUMMARY

Accordingly, the disclosure is directed to a device and a method for selecting a transmission path in a wireless network, so as to automatically detect SSs and appropriately adjust connection line paths, thereby optimizing data transmission performance in a wireless network environment adopting an MIMO mechanism.

The disclosure also provides a device for selecting a transmission path in a wireless network, which includes an RF module, a BB module, and a control module. The RF module is coupled to a plurality of antennas, for processing a packet of a wireless signal respectively received by the antennas. The BB module generates a plurality of SSs corresponding to the antennas respectively according to the packet received by each antenna. The control module is coupled to the BB module, for receiving the SSs, and respectively controlling the antennas to be enabled or disabled according to a preset rule and the SSs.

The disclosure further provides a method for selecting a transmission path in a wireless network, which includes the following steps. A plurality of antennas is provided, and the antennas respectively receive a packet of a wireless signal. A plurality of SSs corresponding to the antennas is generated respectively according to the packet received by each antenna. The antennas are respectively controlled to be enabled or disabled according to a difference between the SSs.

Embodiments of the disclosure and efficacies thereof will be illustrated in detail below with the accompanying drawings.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
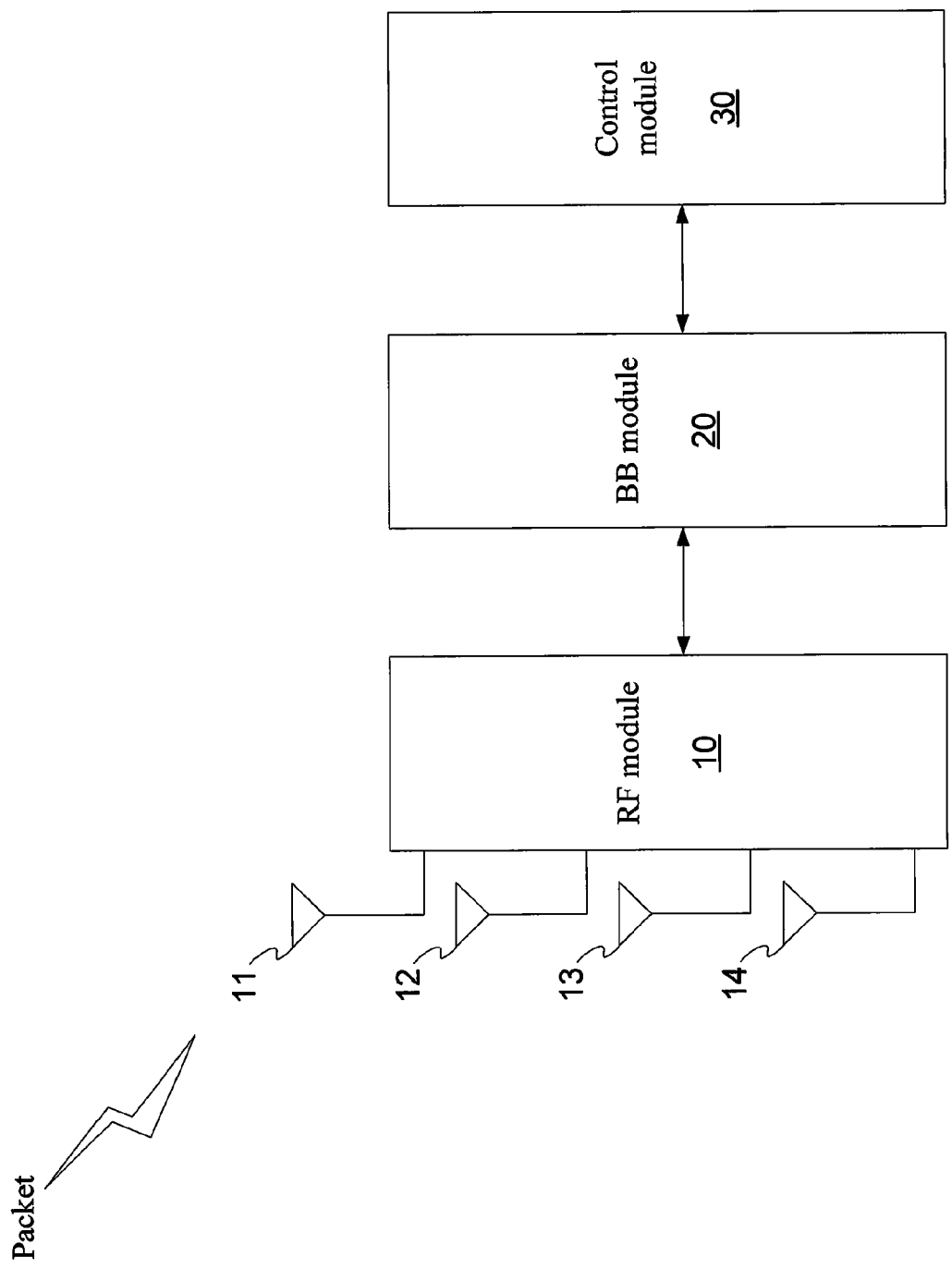
FIG. 1 is a schematic view of a device for selecting a transmission path in a wireless network according to a first embodiment.

FIG. 1 is a schematic view of a device for selecting a transmission path in a wireless network according to a first embodiment. Please refer to FIG. 1, in which the device includes an RF module 10, a BB module 20, and a control module 30.

The RF module 10 is coupled to a plurality of antennas (as shown in FIG. 1, four antennas 11 to 14 are provided), and each antenna respectively receives a packet of a wireless signal. A number of the antennas may be set according to demands, and is not limited herein. The BB module 20 respectively demodulates the packet received by each of the antennas 11 to 14, and generates an SS corresponding to each of the antennas 11 to 14.

The control module 30 controls the antennas to be enabled or disabled according to each SS of the antennas 11 to 14. In the embodiment as shown in FIG. 1, the RF module 10 has four antennas 11 to 14, which respectively form four transmission paths. However, in order to prevent the problem in the prior art resulting from an excessively large difference between the SSs respectively corresponding to the antennas 11 to 14, in the embodiment the control module 30 adjusts the transmission path of each antenna, such that each antenna is enabled or disabled in an appropriate state, thereby preventing the transmission quality becomes too low due to the excessively large difference between the SSs of the antennas.

Figure 2:
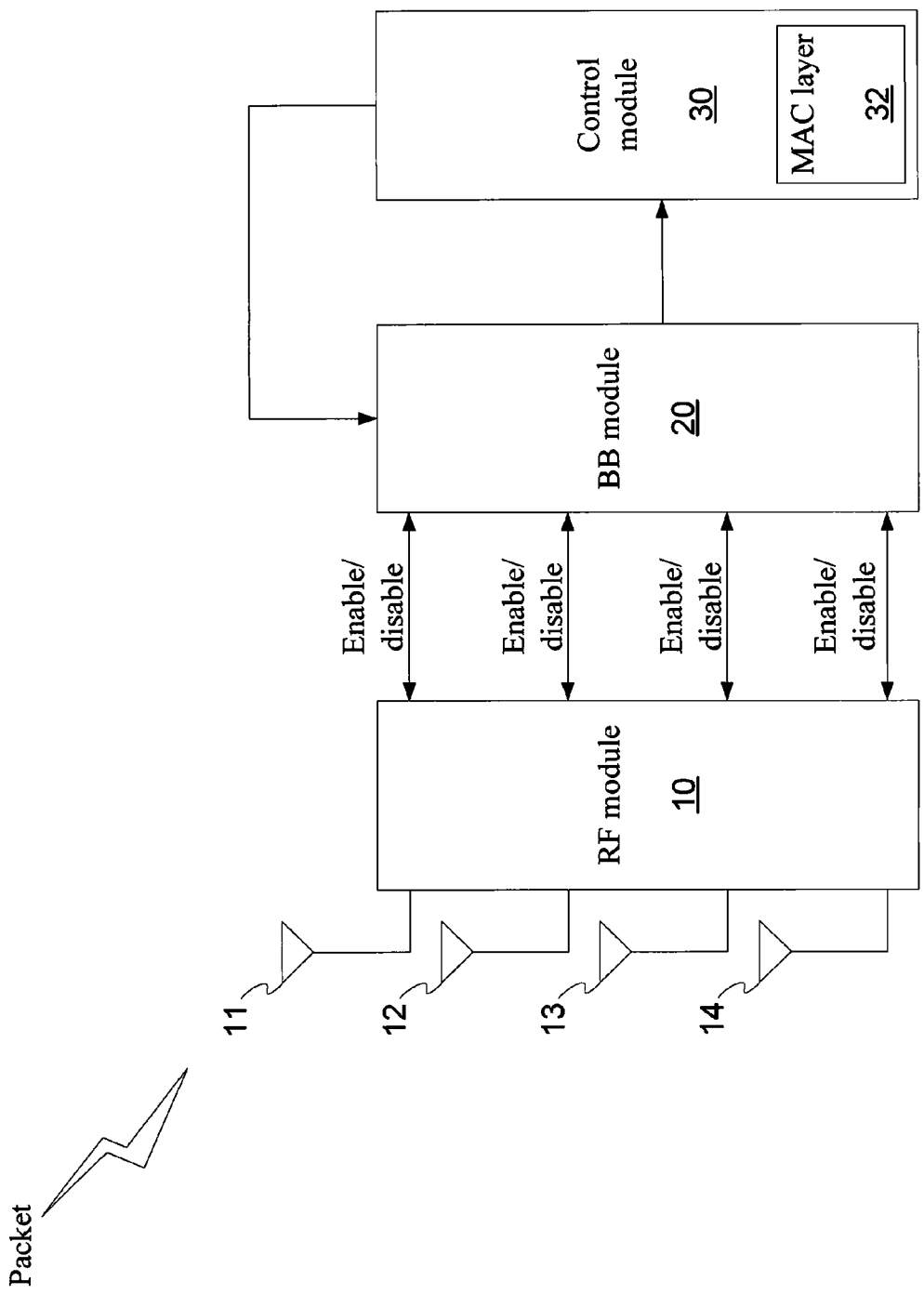
FIG. 2 is a schematic view of a device for selecting a transmission path in a wireless network according to a second embodiment.

FIG. 2 is a schematic view of the device for selecting a transmission path in the wireless network according to a second embodiment. Please refer to FIG. 2, in which the second embodiment, the control module 30 includes a media access control (MAC) layer 32. The MAC layer 32 determines whether the packet is sent from a correct source and is required to be transmitted to the device for selecting a transmission path through an MAC address. If yes, the MAC layer 32 determines whether the antenna receiving the packet is to be enabled or disabled, according to the SS corresponding to the packet. When generating an enable/disable signal according to the SS, the control module 30 firstly transmits the enable/disable signal to the BB module 20, and then the BB module 20 transmits the enable/disable signal to the RF module 10. Therefore, each of the antennas 11 to 14 in the RF module 10 receives the corresponding enable/disable signal, and is determined to be enabled or disabled.

The device for selecting a transmission path according to the disclosure may be applied to a station (STA) or an access point (AP) in a wireless network environment. Moreover, the device of the disclosure may be applied to an RX or a TX.

In addition, the control module 30 may also include a driver for driving the mechanism of the device when selecting a transmission path.

In the following paragraph, it is illustrated that the enable/disable state of each antenna is controlled according to the SS. According to an operation of a Boltzmann constant and in consideration of thermal noises of common elements as well as other factors, in a wireless network system (generally speaking), when the SS is −70 dBm, an obtained signal to noise ratio (SNR) is approximately 30 dB. The larger the input signal, the higher the SNR obtained. For example, if the SS is −50 dBm, the obtained SNR is approximately 50 dB, and if the SS is −40 dBm, the obtained SNR is approximately 60 dB. However, for a manufacturing technology and element characteristics of a current integrated circuit (IC), the SNR commonly provided by the RF IC is approximately 30 dB, and the signal received by the BB circuit passes through the antenna and the RF IC, such that the SNR is limited by the RF IC on the front end, and is approximately 30 dB.

Generally, the SS received by the control module 30 is expressed as a percentage by using an absolute SS of the antenna end, for example, −100 dBm to 0 dBm may be expressed as 0% to 100%. Therefore, when the SNR demand of the BB module 20 is larger than 30 dB, it indicates that the absolute SS of the antenna end must be larger than −70 dBm, that is, larger than 30%.

In an embodiment, 30 dB (30% if expressed as a percentage, and other numerical values may definitely also be adopted according to different designs of the designer), serves as a first threshold value. That is to say, when the SS of a certain antenna is smaller than the first threshold value, disabling of the antenna is considered so as to avoid affecting the performance of other antennas. In addition, it should be noted that in the current MIMO wireless network system, the transmitted signal may be correctly interpreted only when a number of the receiving antennas is larger than or equal to a number of spatial streams. That is to say, if the TX transmits a spatial signal, at least one antenna of the RX is required. Likewise, if the TX transmits two spatial signals, at least two antennas of the RX are required, and so forth.

For example, referring to FIGS. 1 and 2, assuming the number of the spatial streams is two, the RF module 10 has four antennas 11 to 14, and the SSs of the four antennas 11 to 14 are respectively −70 dBm, −60 dBm, −30 dBm, and −45 dBm, that is, 30%, 40%, 70%, and 55% when expressed as a percentage. The SS of each antenna is larger than the first threshold value (30%), such that all the four antennas 11 to 14 are enabled, and the four antennas can easily transmit the two spatial streams.

Similarly, assuming the four antennas 11 to 14 have a fading of 20 dB due to an extended distance, and the SSs thereof respectively become −90 dBm, −80 dBm, −50 dBm, and −65 dBm, that is, 10%, 20%, 50%, and 35% when expressed as a percentage. At this time, the SSs of the antenna 11 and the antenna 12 are lower than the first threshold value (30%). If the antenna 11 and the antenna 12 is still working, the performance of the entire wireless network will become worse, such as the signal receiving capabilities of the antenna 13 and the antenna 14 are affected. Therefore, it should be considered whether the antenna 11 and the antenna 12 need to be disabled.

Various factors in the wireless network environment may change the SS during the signal being received by the antenna. Therefore, in order to dynamically control the antenna, the control module 30 updates the SS of each of the antennas 11 to 14 in the BB module 20 at every predetermined period of time, so as to dynamically control the enabling or disabling of the antennas.

The control module 30 controls the antenna to be enabled or disabled. The detailed steps of which are described below in an embodiment. The control module 30 sets a first threshold value and a second threshold value, and compares the SS of each antenna with the first threshold value. If the SS of a certain antenna is smaller than the first threshold value, the control module 30 further determines whether a difference between the SS of the antenna and the SSs of other antennas is too great. Therefore, the SS of the antenna lower than the first threshold value is subtracted from a maximum SS in the SSs to obtain a difference value. If the difference value is larger than the second threshold value, it indicates that the difference between the SSs is too great, and the antenna needs to be disabled.

When the antenna is disabled, the control module 30 records a numerical value of the maximum SS in the SSs, and adds a third threshold value to the numerical value of the maximum SS in the SSs so as to generate an enable threshold value corresponding to the disabled antenna. The enable threshold value is a reference numerical value according to which, the disabled antenna may be enabled again. Here, adding the third threshold value is to prevent instability of the wireless network caused by the antenna easily returning to the enabled state after being disabled due to the disturbance of the SS. In this manner, adding the third threshold value allows the antenna to be enabled only when the SS becomes great. Therefore, the third threshold value varies according to different user demands.

Subsequently, the control module 30 updates the SS of the antenna in the enabled state at every predetermined time, and again enables the antenna when the SS of the enabled antenna is greater than or equal to the enable threshold value of the originally disabled antenna.

An example is given below for the purpose of illustration. It is assumed that the number of the antennas is four as shown in FIG. 1 or 2, and the number of the spatial streams is two. In addition, it is assumed that the first threshold value is 30%, the second threshold value is 18%, and the third threshold value is 5%. In the beginning, the SSs of the four antennas 11 to 14 are respectively expressed as 60%, 55%, 32%, and 29% in percentage. At this time, the SS being 29% of the antenna 14 is smaller than the first threshold value of 30%, and the maximum SS in the SSs of the four antennas is the SS being 60% of the antenna 11, so that the difference value obtained by subtracting the SS being 29% of the antenna 14 from the SS being 60% of the antenna 11 is 31%, which is greater than the second threshold value of 18%. Therefore, the antenna 14 is disabled, and the enable threshold value of the antenna 14 is recorded, that is, 60% plus the third threshold value of 5%, such that the enable threshold value corresponding to the antenna 14 is 65%.

When the SSs decays or the environment is changed, the obtained SSs of the antennas 11 to 13 are respectively 53%, 56%, and 29% (the antenna 14 is disabled and has no SS). The control module 30 determines that the SS being 29% of the antenna 13 is smaller than the first threshold value of 30%, and the maximum SS in the SSs of the three antennas is the SS being 56% of the antenna 12, so that the difference value obtained by subtracting the SS being 29% of the antenna 13 from the SS being 56% of the antenna 12 is 27%, which is greater than the second threshold value of 18%. Therefore, the antenna 13 is disabled, and the enable threshold value of the antenna 13 is recorded, that is, 56% plus the third threshold value of 5%, such that the enable threshold value corresponding to the antenna 13 is 61%.

Two transmission paths, the transmission paths formed by the antenna 11 and the antenna 12, remained at this point. When the signal becomes stronger, the obtained SSs of the antenna 11 and the antenna 12 respectively reach 61% and 59%, and the maximum SS in the SSs of the antennas in the enabled state is the SS value of 61% of the antenna 11, which is just equal to the enable threshold value of 61% corresponding to the antenna 13, so that the antenna 13 is enabled.

Here, three antennas are enabled, and it is assumed that after the signal becomes stronger, the SSs of the antennas 11 to 13 respectively become 64%, 65%, and 33%. The maximum SS in the SSs of the antennas in the enabled state is the SS value of 65% of the antenna 12, which is just equal to the enable threshold value of 65% corresponding to the antenna 14, so that the antenna 14 is enabled. The enable threshold value may be an appropriate value obtained through experimentation and practice, and may be a fixed preset value.

Figure 3:
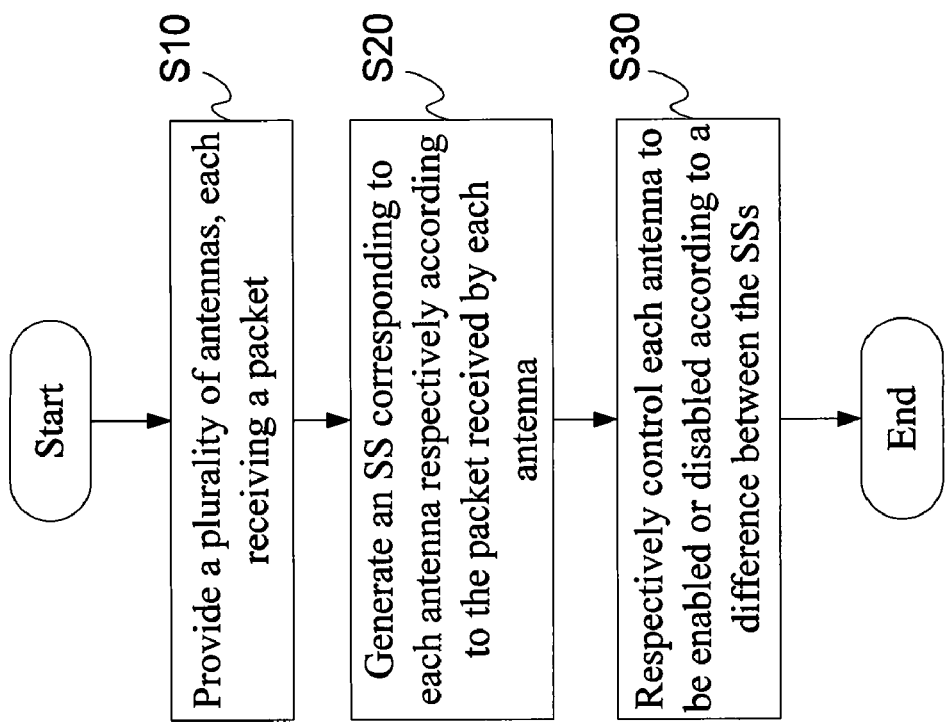
FIG. 3 is a flow chart of a method for selecting a transmission path in a wireless network.

FIG. 3 is a flow chart of a method for selecting a transmission path in a wireless network, which includes the following steps.

In Step S10, a plurality of antennas is provided, and each antenna respectively receives a packet of a wireless signal.

In Step S20, an SS corresponding to each antenna is generated respectively according to the packet received by each antenna.

In Step S30, each antenna is respectively controlled to be enabled or disabled according to a difference between the SSs.

In addition to the above steps, the method further includes the following steps. The SS of each antenna is updated at every predetermined period of time, so as to control the antennas dynamically.

A number of the enabled antennas are controlled to be larger than or equal to a number of spatial streams. The SSs are compared with a first threshold value. When the SS of the antenna is smaller than the first threshold value, the SS of the antenna is subtracted from a maximum SS in the SSs in order to generate a difference value. The difference value is compared with a second threshold value. When the difference value is larger than the second threshold value, the antenna is disabled. That is to say, when the maximum difference value of the SSs is larger than the second threshold value, the antenna having the SS smaller than the first threshold value is disabled. The first threshold value may be 30 dB.

The maximum SS in the SSs when the antenna is disabled is recorded. A third threshold value is added to the maximum SS in the SSs in order to generate an enable threshold value corresponding to the antenna. That is to say, the enable threshold value is generated according to the maximum SS in the SSs. The SS of the enabled antenna is updated at every predetermined period of time. When the SS of the enabled antenna is greater than or equal to the enable threshold value of the antenna, the originally disabled antenna is enabled.

While the disclosure has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A device for enabling transmission paths in a wireless network, comprising:
    a radio frequency (RF) module, coupled to a plurality of antennas, for processing a packet of a wireless signal respectively received by the antennas;
    a base band (BB) module, for generating a plurality of signal strengths (SSs) corresponding to the antennas respectively according to the packet received by each antenna; and
    a control module, coupled to the BB module, for receiving the SSs, and respectively controlling the antennas so that they may be enabled or disabled according to a preset rule and the SSs, wherein the antennas are enabled or disabled based on difference value of the SSs, and wherein each of the plurality of antennas is capable of being enabled or disabled independent of the enable or disabled state of the remaining antennas.

2. The device according to claim 1, wherein at every predetermined period of time, the control module updates the SSs, so as to control the antennas.

3. The device according to claim 1, wherein a number of the enabled antennas is larger than or equal to a number of spatial streams.

4. The device according to claim 1, wherein the preset rule is when a maximum difference value of the SSs is larger than a second threshold value, the antenna having the SS smaller than a first threshold value is disabled.

5. The device according to claim 4, wherein the first threshold value is 30 dB.

6. The device according to claim 4, wherein the control module generates an enable threshold value according to a maximum SS in the SSs.

7. The device according to claim 6, wherein when the SS of the enabled antenna is larger than or equal to the enable threshold value, the disabled antenna is enabled.

8. The device according to claim 1, wherein the control module comprises a medium access control (MAC) layer.

9. A method for enabling transmission paths in a wireless network, comprising:
    providing a plurality of antennas, each receiving a packet of a wireless signal;
    generating a plurality of signal strengths (SSs) corresponding to the antennas respectively according to the packet received by each antenna; and
    respectively controlling the antennas to be enabled or disabled according to a difference between the SSs, and wherein each of the plurality of antennas is capable of being enabled or disabled independent of the enable or disabled state of the remaining antennas.

10. The method according to claim 9, further comprising:
    updating the SSs at every predetermined period of time, so as to control the antennas.

11. The method according to claim 9, wherein a number of the enabled antennas is larger than or equal to a number of spatial streams.

12. The method according to claim 9, further comprising:
    comparing the SSs with a first threshold value;
    subtracting the SS of the antenna from a maximum SS in the SSs to generate a difference value, when the SS of the antenna is smaller than the first threshold value;
    comparing the difference value with a second threshold value; and
    disabling the antenna when the difference value is larger than the second threshold value.

13. The method according to claim 12, wherein the first threshold value is 30 dB.

14. The method according to claim 12, further comprising:
recording the maximum SS in the SSs when the antenna is disabled; and
adding a third threshold value to the maximum SS in the SSs, so as to generate an enable threshold value corresponding to the antenna.

15. The method according to claim 14, further comprising:
updating the SS of the enabled antenna at every predetermined period oftime; and
enabling the antenna, when the SS of the enabled antenna is larger than or equal to the enable threshold value of the antenna.

16. The method according to claim 9, further comprising:
disabling the antenna having the SS smaller than a first threshold value, when a maximum difference value of the SSs is larger than a second threshold value.

17. The method according to claim 16, further comprising:
generating an enable threshold value according to a maximum SS in the SSs.

18. The method according to claim 17, further comprising:
enabling the disabled antenna, when the SS of the enabled antenna is larger than or equal to the enable threshold value.

* * * * *